United States Patent
Waite et al.

(10) Patent No.: US 10,564,029 B2
(45) Date of Patent: Feb. 18, 2020

(54) WASTE CONTAINER WITH WEIGHT-MEASUREMENT SYSTEM

(71) Applicant: BACE, LLC, Charlotte, NC (US)

(72) Inventors: Frederick Waite, Huntersville, NC (US); Drew Sigmund, Jr., Matthews, NC (US); Matt Hatfield, Huntersville, NC (US); Matthew Perry, Monroe, NC (US)

(73) Assignee: BACE, LLC, Charlotte, NC (US)

( * ) Notice: Subject to any disclaimer, the term of this patent is extended or adjusted under 35 U.S.C. 154(b) by 165 days.

(21) Appl. No.: 15/483,816

(22) Filed: Apr. 10, 2017

(65) Prior Publication Data

US 2017/0211969 A1    Jul. 27, 2017

Related U.S. Application Data (63) Continuation-in-part of application No. 13/690,574, filed on Nov. 30, 2012.
(Continued)

(51) Int. Cl.
*G01G 19/52* (2006.01)
*B09B 5/00* (2006.01)
*B65F 1/14* (2006.01)

(52) U.S. Cl.
CPC .............. *G01G 19/52* (2013.01); *B09B 5/00* (2013.01); *B65F 1/1405* (2013.01);
(Continued)

(58) Field of Classification Search
CPC ....... B09B 5/00; B30B 9/3007; B30B 9/3046; B65B 63/02; B65F 1/1405; B65F 1/1473;
(Continued)

(56) References Cited

U.S. PATENT DOCUMENTS

| 3,893,386 A | 7/1975 | Wise |
| 4,742,880 A | 5/1988 | Schrag et al. |

(Continued)

FOREIGN PATENT DOCUMENTS

| CA | 2014-E23101 | * | 2/2014 |
| EP | 0508753 | | 10/1992 |

(Continued)

OTHER PUBLICATIONS

Pandora Intelligent Networks <http://www.pandoraintelligentnetworks.com/about.aspx> Retrieved Apr. 6, 2016, 2 pages.
(Continued)

*Primary Examiner* — Hirdepal Singh
(74) *Attorney, Agent, or Firm* — Gardner Groff & Greenwald, PC (57) ABSTRACT

A weight-measurement system for inclusion or use with a waste container includes scale devices in communication with a remote computer via a communications module. The scale devices can be provided by load cells for example load-pin load cells used as axles for wheels mounted to a base frame supporting the waste container so that the wheeled base frame serves as a scale platform for the waste container. The remote computer can be programmed to receive from the load cells, via the communications module, weight data representing the total weight of the waste container and its waste contents, then deduct the known weight of the waste container when empty, to determine the actual weight of the waste contained in the waste container. And the computer can be programmed for providing a notification if a preset waste weight limit is met or neared and automatically scheduling emptying by a waste-collection vehicle.

19 Claims, 11 Drawing Sheets

Related U.S. Application Data (60) Provisional application No. 62/319,868, filed on Apr. 8, 2016.

(52) U.S. Cl.
CPC ...... *B65F 1/1473* (2013.01); *B65F 2210/128* (2013.01); *B65F 2210/184* (2013.01)

(58) Field of Classification Search
CPC ......... B65F 2210/128; B65F 2210/184; G01G 19/00; G01G 19/52; G01G 21/22
USPC .......................................................... 340/666
See application file for complete search history.

(56) References Cited

U.S. PATENT DOCUMENTS

| | | | |
|---|---|---|---|
| 4,773,027 A | 9/1988 | Neumann | |
| 5,016,197 A * | 5/1991 | Neumann | B30B 9/3007 |
| | | | 100/229 A |
| 5,174,198 A | 12/1992 | Bolstad | |
| 5,350,493 A | 9/1994 | Nguyen | |
| 5,384,436 A | 1/1995 | Pritchard | |
| 5,742,010 A | 4/1998 | Griffin | |
| 6,360,186 B1 | 3/2002 | Durbin | |
| 6,378,276 B1 | 4/2002 | Dorge et al. | |
| 6,525,276 B1 * | 2/2003 | Vellidus | A01B 79/005 |
| | | | 177/136 |
| 7,146,294 B1 | 12/2006 | Waitkus | |
| 7,166,229 B2 * | 1/2007 | Cote | B01D 33/15 |
| | | | 210/739 |
| 7,406,402 B1 * | 7/2008 | Waitkus, Jr. | G06Q 10/08 |
| | | | 702/188 |
| 7,957,937 B2 | 6/2011 | Waitkus | |
| 2006/0080819 A1 | 4/2006 | McAllister | |
| 2007/0068238 A1 * | 3/2007 | Wendte | B60C 23/002 |
| | | | 73/146 |
| 2007/0175341 A1 | 8/2007 | Roberts | |
| 2007/0185612 A1 | 8/2007 | Stevens | |
| 2008/0061125 A1 | 3/2008 | Langlois et al. | |
| 2009/0235628 A1 | 9/2009 | Derstine et al. | |
| 2010/0179912 A1 * | 7/2010 | Curotto | G06Q 10/30 |
| | | | 705/308 |
| 2010/0304672 A1 * | 12/2010 | Lerner | G01G 23/3735 |
| | | | 455/41.2 |
| 2012/0073456 A1 * | 3/2012 | Lyle | B30B 9/305 |
| | | | 100/48 |
| 2012/0152133 A1 | 6/2012 | Newsome | |
| 2012/0285750 A1 * | 11/2012 | Hynes | G01G 19/083 |
| | | | 177/1 |
| 2014/0122347 A1 | 5/2014 | Moran et al. | |
| 2015/0013579 A1 * | 1/2015 | Mariman | A01B 76/00 |
| | | | 111/59 |
| 2016/0356640 A1 * | 12/2016 | Freeman | G01G 19/52 |
| 2018/0340813 A1 * | 11/2018 | Cowles | B62B 3/104 |

FOREIGN PATENT DOCUMENTS

| | | |
|---|---|---|
| EP | 0967320 | 12/1999 |
| GB | 1507800 | 4/1978 |
| JP | 2000142657 | 5/2000 |
| KR | 100252464 | 4/2000 |
| WO | 2009044092 | 4/2009 |

OTHER PUBLICATIONS

Marathon Equipment Company, "RamJet Compactor Options," at least as early as Apr. 8, 2016, 8 pages.

WasteCare Corporation, "60" Vertical Balers Comparison Chart," accessed by Web Archive on Aug. 13, 2010, 5 pages.

Green Recycling, "Services—Recycling Card/Cardboard/OGG (Old Corrugated Cardboard)," accessed by WebArchive on Jun. 18, 2012, 4 pages.

\* cited by examiner

WASTE CONTAINER WITH WEIGHT-MEASUREMENT SYSTEM

CROSS-REFERENCE TO RELATED APPLICATION

This application claims the priority benefit of U.S. Provisional Patent Application Ser. No. 62/319,868, filed Apr. 8, 2016, and this application is a continuation-in-part of U.S. Non-Provisional patent application Ser. No. 13/690,574, filed Nov. 30, 2012, which are hereby incorporated herein by reference.

TECHNICAL FIELD

The present invention relates generally to equipment for containing waste, and particularly to waste-containing equipment for monitoring the contained waste for timely emptying thereof.

BACKGROUND

Waste containers are commonly used to store rubbish until they can be emptied and their contents hauled away by a garbage truck or other waste-collection vehicle. Such waste containers include large-scale mechanized equipment (such as compactors, balers, etc.) and non-mechanized units (dumpsters, open-tops, recycling containers, etc.). These waste containers are commonly used at many types of sites, such as industrial facilities, commercial buildings, apartment buildings, construction sites, and so forth. And these waste containers are commonly used to store all types of waste, including corrugated cardboard; paper; objects or scraps of plastic, nonferrous metals (e.g., aluminum), glass, and/or other recyclable materials; food waste; yard waste; building-material waste; and other dry and wet waste.

There are tremendous monies associated with the disposal and/or selling of the waste (recyclable and non-recyclable) materials. For some situations, the weight of the waste material is used to determine disposal fees or selling prices (e.g., by haulers as well as by landfills or recyclers). And for some situations, there are "tipping" charges for regularly scheduled (e.g., weekly) emptying of the waste containers. So systems have been developed in an effort to determine the weight of the waste and/or the fullness of the waste container to thereby provide more transparency in these financial transactions (disposal and/or selling), to avoid excessive tipping charges (from premature emptying), and/or to avoid fines for weight overages when hauling away. However, known measuring systems have drawbacks, for example weight measurements that can be insufficiently accurate (estimates converted from fullness measurements), external components and attachment positions that can cause interference issues, limited retrofit capabilities, and/or too-high costs.

Accordingly, it can be seen that needs exist for better ways of measuring waste in waste containers. It is to the provision of solutions to this and other problems that the present invention is primarily directed.

SUMMARY

Generally described, the present invention relates to a weight-measurement system for inclusion or use with a waste container. The weight-measurement system includes scale devices in communication with a remote computer via a communications module. The scale devices can be provided by load cells for example load-pin load cells used as axles for wheels mounted to a base frame supporting the waste container so that the wheeled base frame serves as a scale platform for the waste container. The remote computer can be programmed to receive from the load cells, via the communications module, weight data representing the total weight of the waste container and its waste contents, then deduct the known weight of the waste container when empty, to determine the actual weight of the waste contained in the waste container. And the computer can be programmed for providing a notification if a preset waste weight limit is met or neared and automatically scheduling emptying by a waste-collection vehicle.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

The present invention generally relates to a scaling system that can be used in the waste and recycling sector to weigh the waste contents of a waste container. As used herein, the term "waste" is broadly intended to include recyclable and non-recyclable materials and the term "waste container system" is broadly intended to include large-capacity commercial/industrial compactors, balers, etc., as identified in the background section above. Also, any dimensions disclosed in this or any related application are representative of a typical commercial embodiment and are provided for illustration purposes only, and thus are not limiting of the invention.

FIGS. 1-10 show a waste container system 100 outfitted with a weight-measurement system 140 according to a first example embodiment of the invention. The weight-measurement system 140 can be used to accurately weigh the waste container 100. The weight-measurement system 140 does this by utilizing the waste container 100 as a scale base/platform for supporting the waste material that is being weighed. With the weight of the waste container 100 when empty being a predetermined/known fixed value, and with the weight of the waste container when containing waste being accurately determinable by the weight-measurement system 140, the weight of the waste contents can be accurately determined.

Referring particularly to FIGS. 1-4, the waste container system 100 that the weight-measurement system 140 can be used with may be of any conventional type such as the depicted large-capacity self-contained compactor. In the depicted embodiment, the compactor-type waste container 100 includes a charge chamber 102 that initially receives the waste materials (not shown) to be compacted and a compacting chamber 104 in which the received waste materials are compacted and stored. The charge chamber 102 and the compacting chamber 104 together form a unitary compacting/storage container 106 (also referred to as the "can"). A charge opening 108 at one end of the overall container 106 provides insertion access to the charge chamber 102 and a hinged dump door 110 at the opposite end of the overall chamber provides removal access to the compacting chamber 104. The compacting/storage container 106 includes left and right sidewalls 112 and a bottom wall 114 extending the full container length, and a top wall 116 extending the compacting chamber 104 length.

A powered compacting mechanism (not shown) typically includes a hydraulically operated ram that moves horizontally within the overall container 106 from the charge chamber 102 toward the compacting chamber 104. A compaction control system (not shown) includes conventional control components and connections for safely operating the hydraulic ram. Also, options for the waste container 100 typically include dog houses, hoppers, and/or chutes for feeding the waste into the charge chamber 104.

A base frame 118 includes support rails 120 and a plurality (e.g., typically four, optionally six or more) of wheel assemblies 122 to support and enable easy movement of the compacting/storage container 106. The support rails 120 can form a lattice or grid structural framework, as depicted, and a plate or panel can be mounted over this and be separate from or serve as the bottom wall of the waste container. In the depicted embodiment, the compacting/storage container 106 and the base frame 118 are attached together to form an integral unit. In other embodiments, the compacting/storage container is removably mounted on the wheeled base frame so that it can be removed for emptying while the wheeled base frame (and at least the weight-measurement scale devices of the weight-measurement system 140 mounted to it) remains onsite.

In use, waste materials are fed into the charge chamber 102 through the charge opening 108. The waste materials are then pushed toward the compacting chamber 104, and are compacted therein, by the hydraulic ram. The compacted waste then remains stored within the compacting chamber 106, preferably until the compacting chamber is substantially completely filled with compacted waste materials. The waste container 100, along with the compacted/stored waste therein, is then hauled to a collection and/or waste disposal facility where the compacted waste is dumped or otherwise removed from the compacting/storage container 106 for example through the dump door 110.

Such compactor waste container systems 100 are commercially available from numerous suppliers, including BACE, LLC (Charlotte, N.C.). As the waste container 100 can be of such a conventional type, and additional structural and operational details are not needed for a complete understanding of the invention, such additional details are excluded for brevity.

The weight-measurement system 140 can be used to weigh the waste contents of the waste container system 100. The weight-measurement system 140 for each the waste container 100 includes a plurality of scale devices 142 for weight sensing and a communications system 144 that includes a communications module 146 to which the scale devices are operably connected. In the depicted embodiment, for example, the scale devices 142 are connected to the communications module 146 by wiring 148 such as a control cable and an electric power cable routed along and attached to the compacting/storage container 106. This wiring 148 can be bundled together with hydraulic lines for the hydraulic ram and connectable to the compaction control unit (not shown, can be integrated with the communications module 146) for the hydraulic ram, or it can run separately from the hydraulic lines. In other embodiments, the scale devices are connected to the communications module by conventional wireless technology, with the scale devices and the communications system each including an antenna and a transmitter or receiver (or transceiver).

Figure 1:
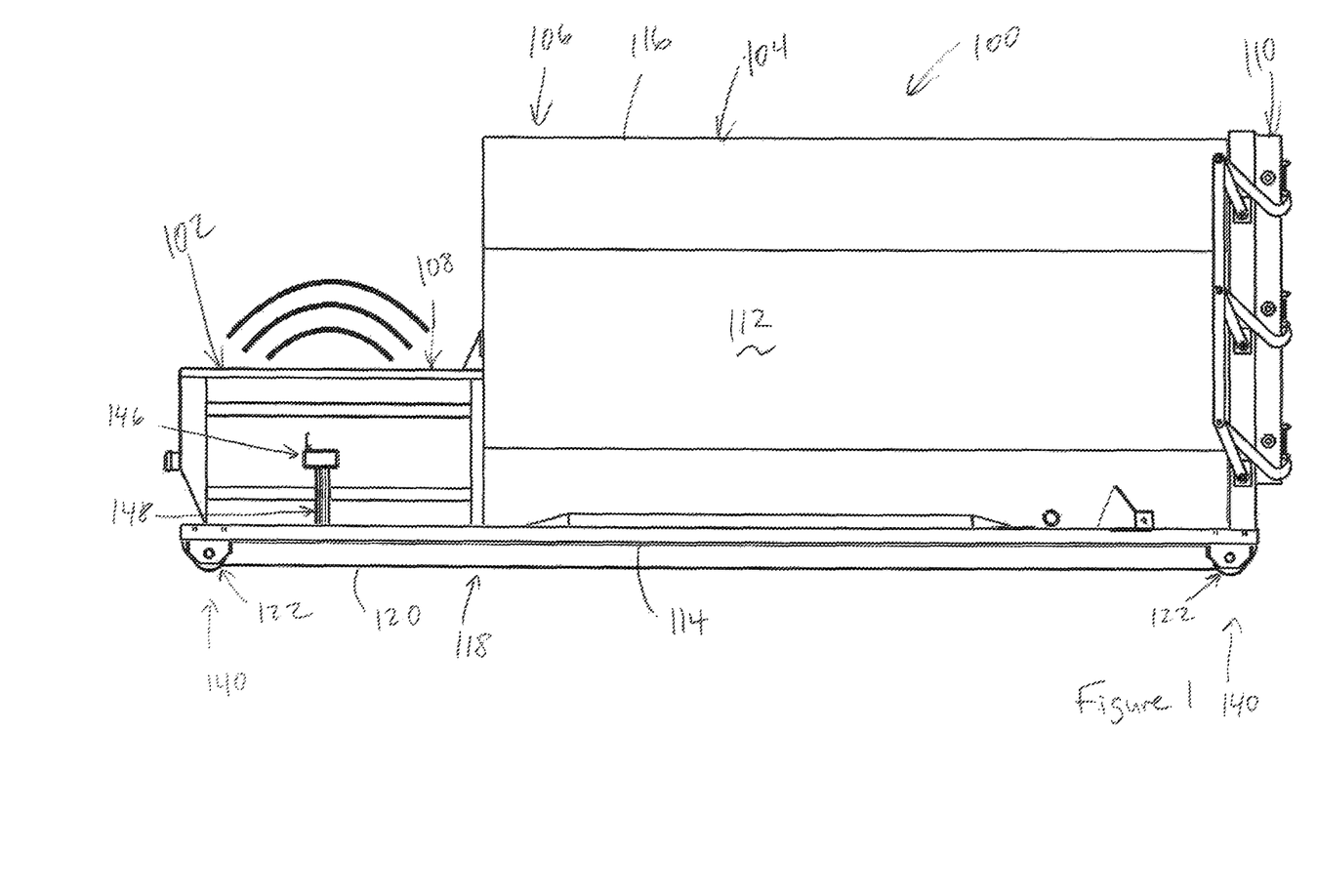
FIG. 1 is a side view of a waste container system outfitted with a weight-measurement system according to a first example embodiment of the present invention.
Figure 2:
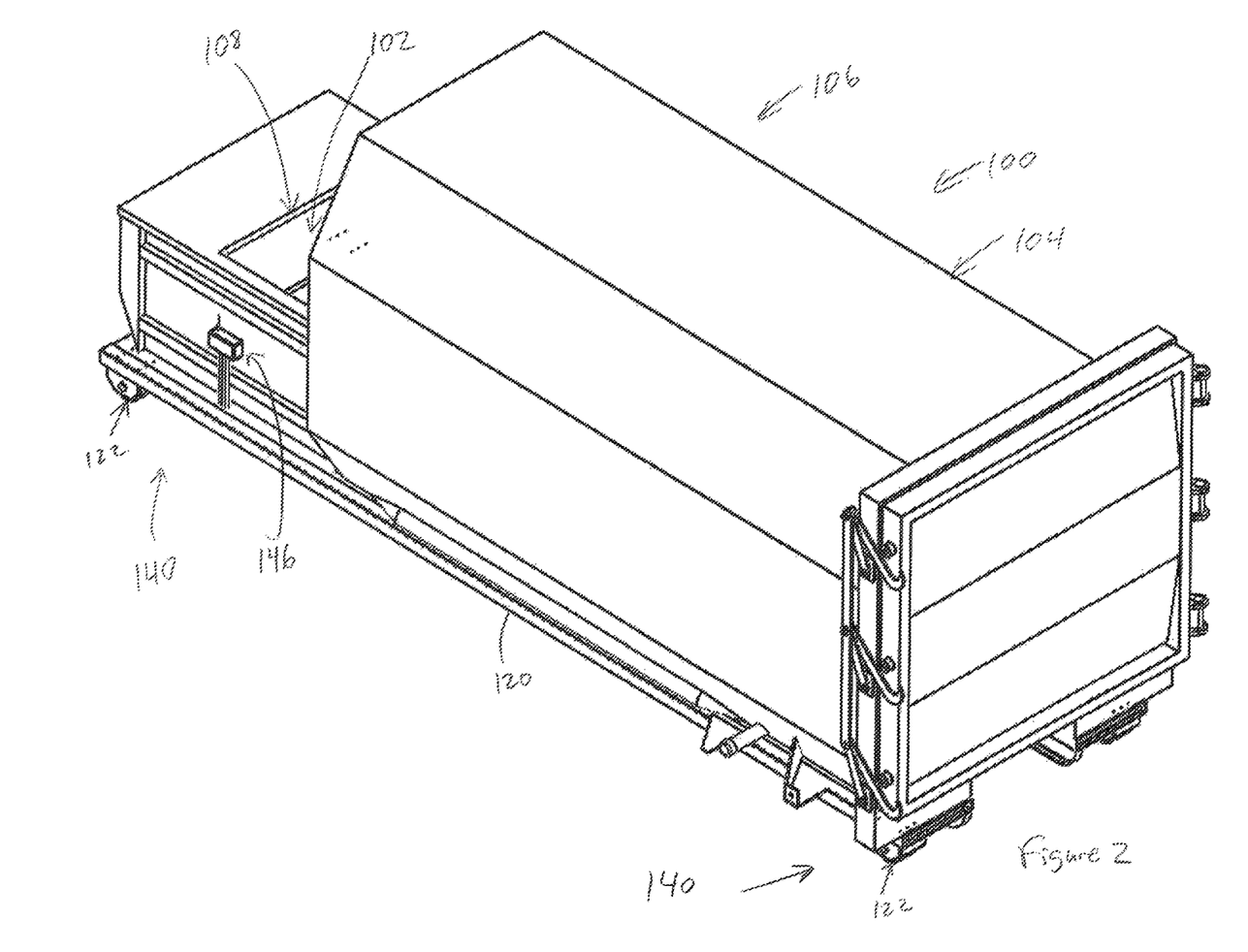
FIG. 2 is a perspective view of the waste container and weight-measurement system of FIG. 1.
Figure 3:
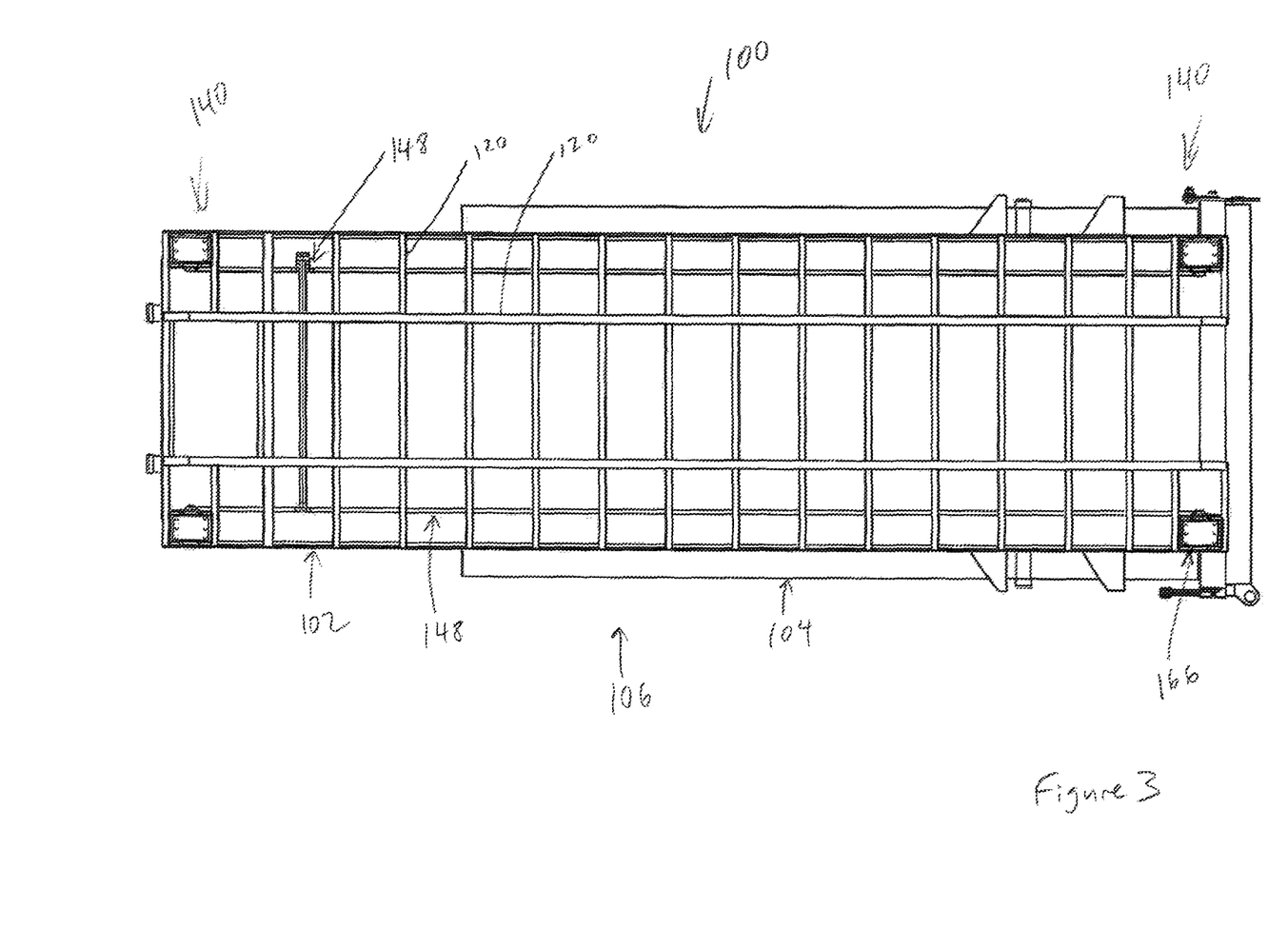
FIG. 3 is a bottom view of the waste container and weight-measurement system of FIG. 1 without wheel assemblies.
Figure 4:
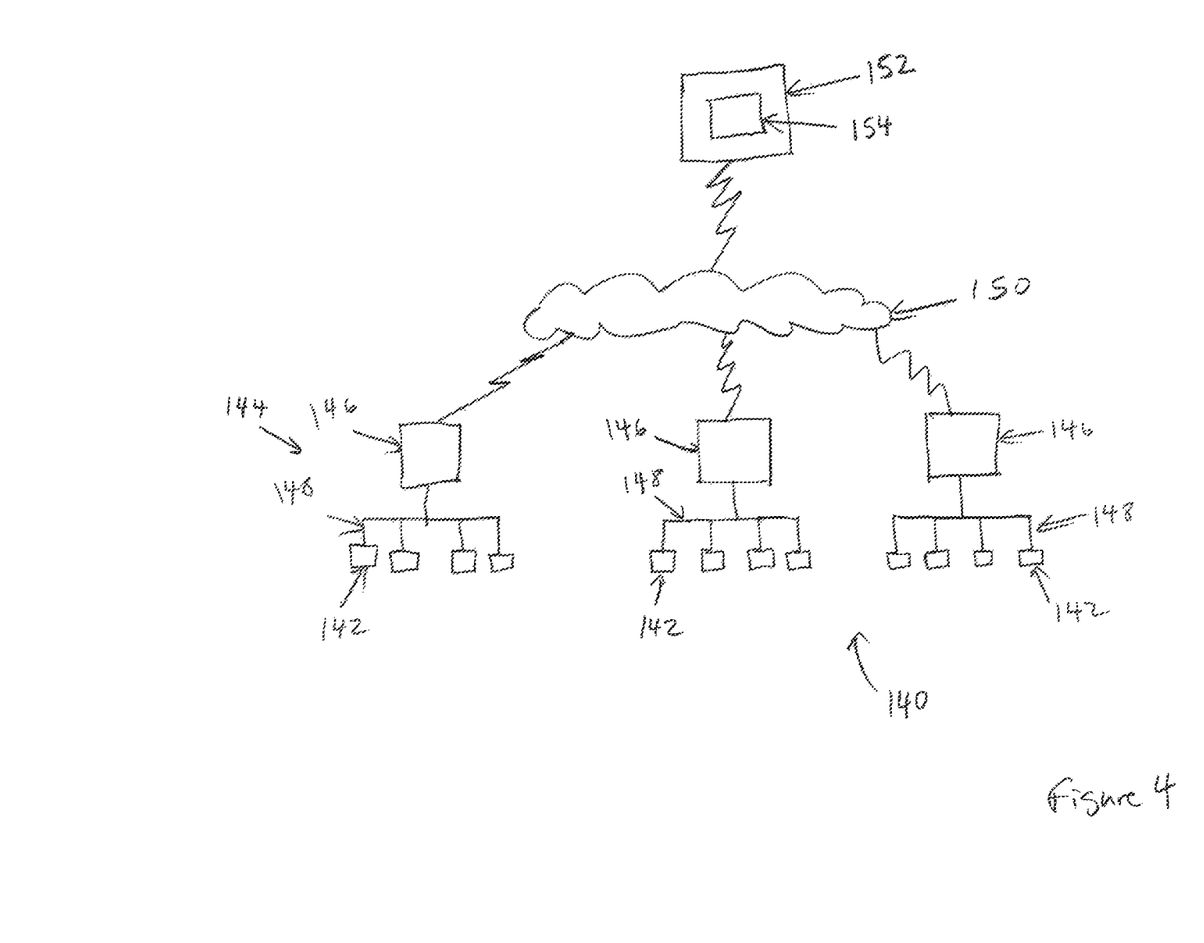
FIG. 4 is a schematic diagram of the weight-measurement system of FIG. 1, including scale devices and communications systems.
Figure 5:
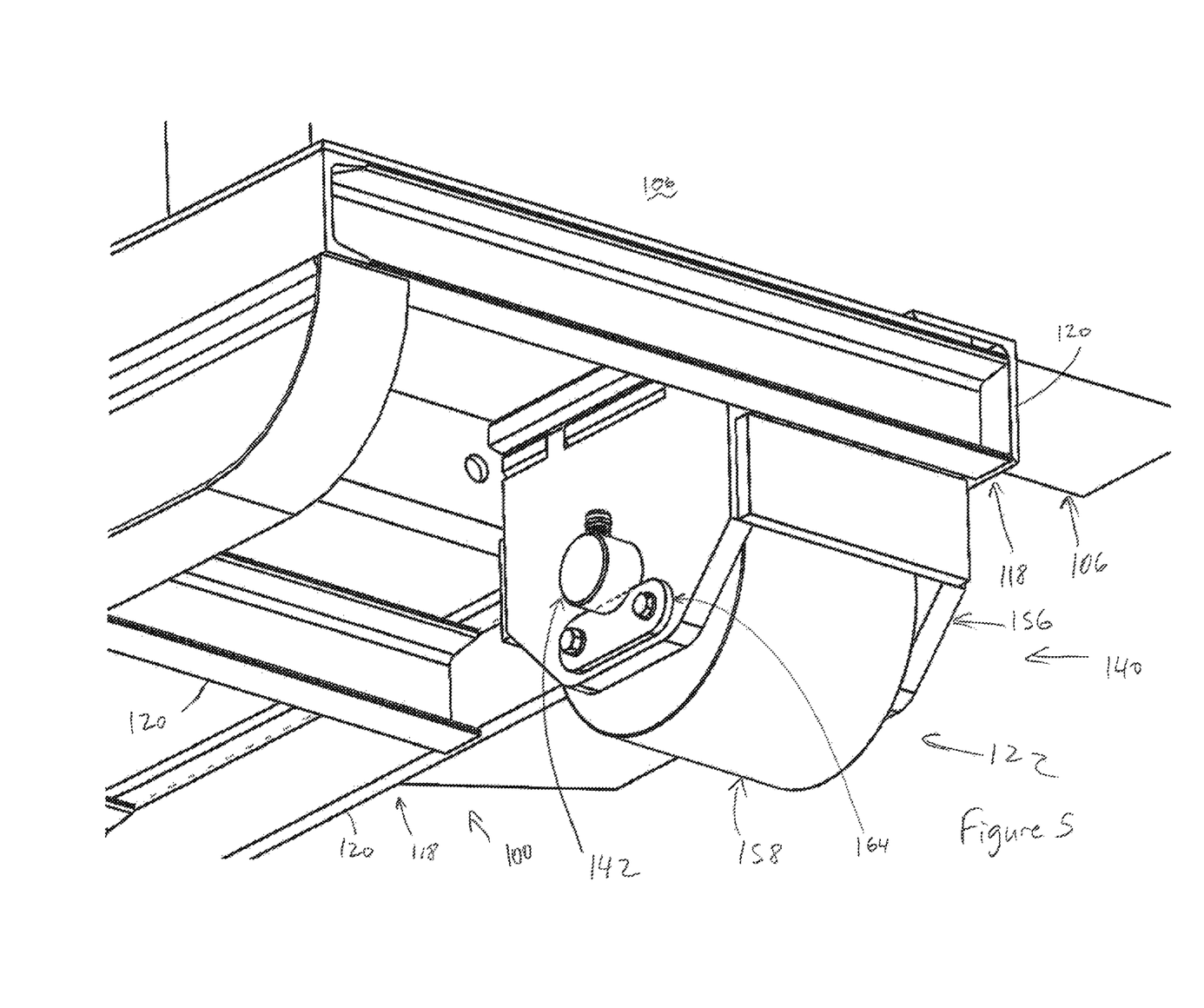
FIG. 5 is a perspective view of a portion of the waste container and weight-measurement system of FIG. 1, showing one of the scale devices as a load cell used as an axle for a wheel assembly of the waste container.
Figure 6:
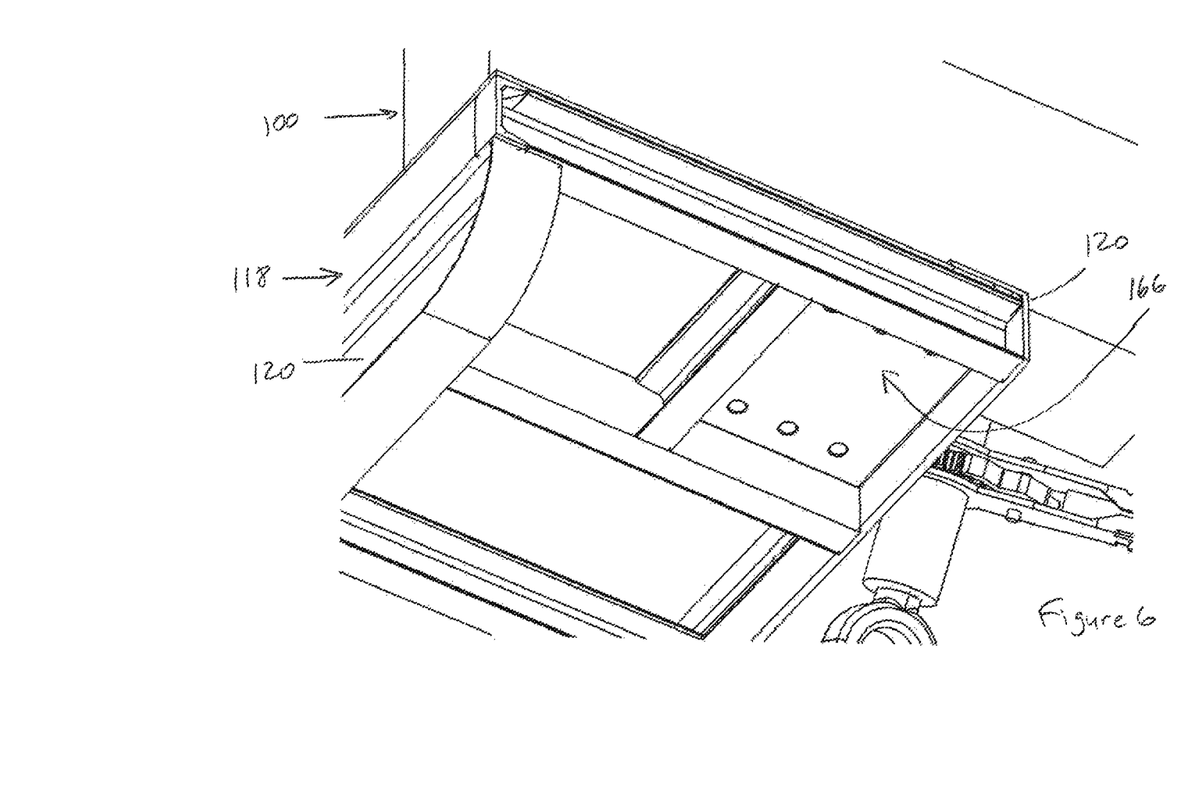
FIG. 6 shows the waste container portion of FIG. 5 without the corresponding wheel assembly mounted to it.
Figure 7:
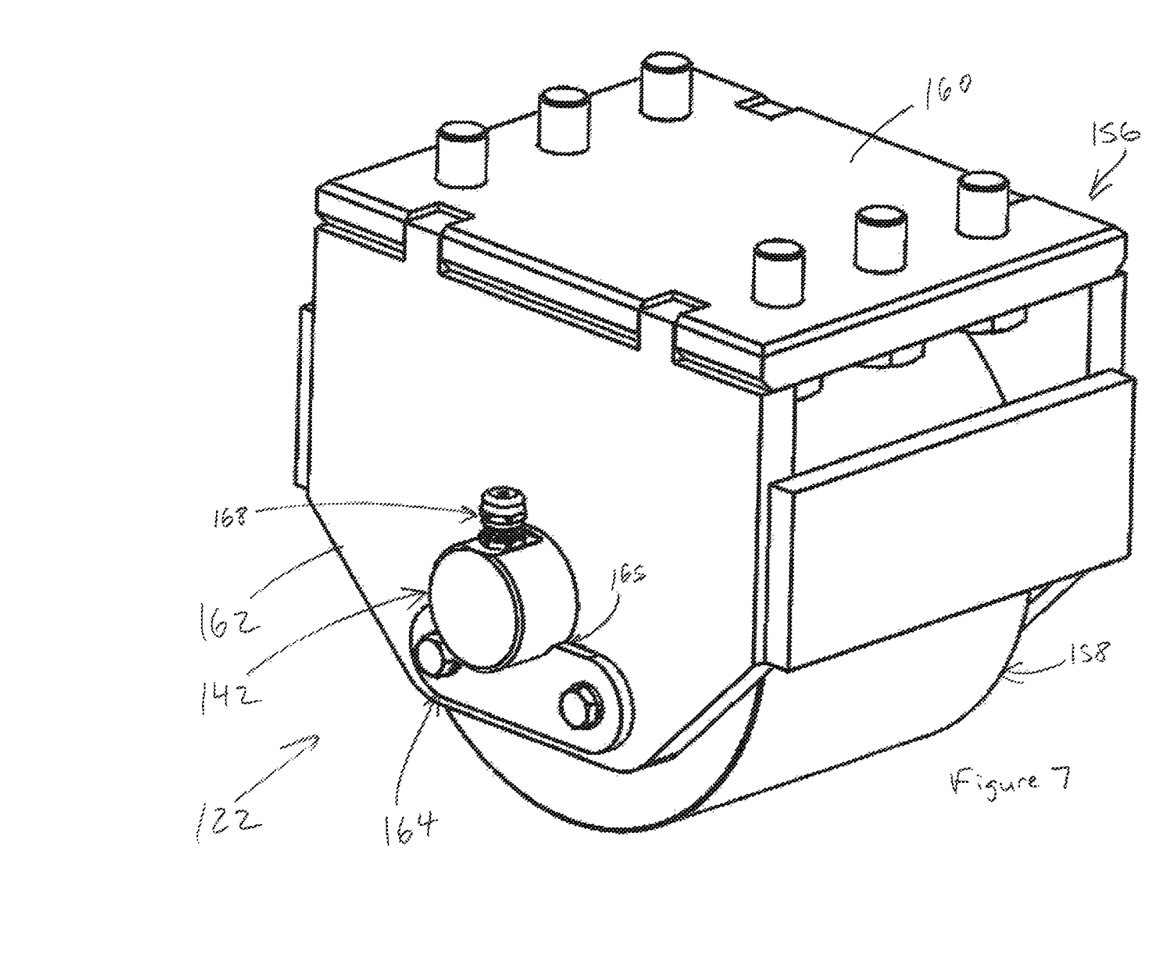
FIG. 7 is a perspective view of the wheel assembly of FIG. 5.
Figure 8:
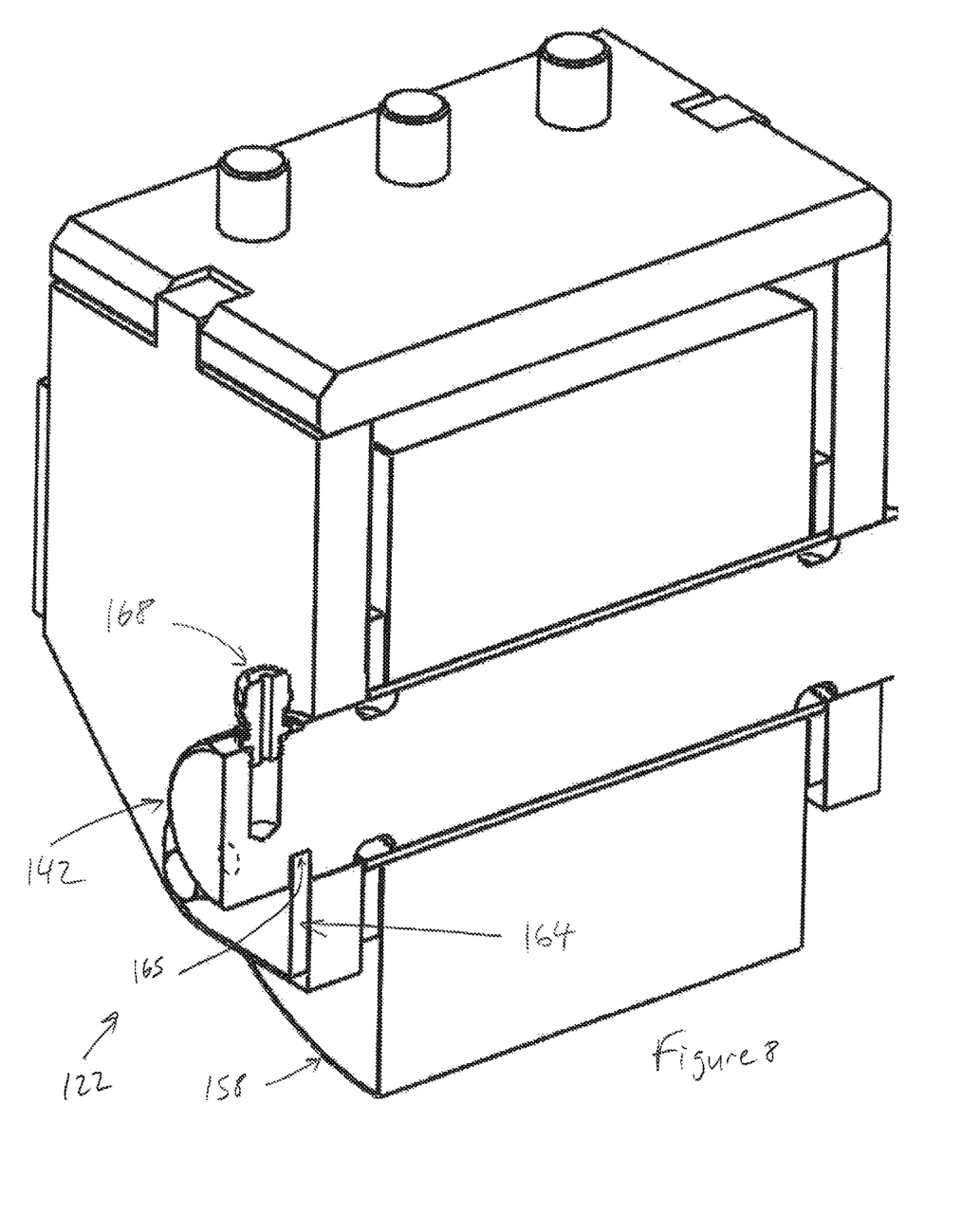
FIG. 8 is a cross-sectional perspective view of the wheel assembly of FIG. 7.
Figure 9:
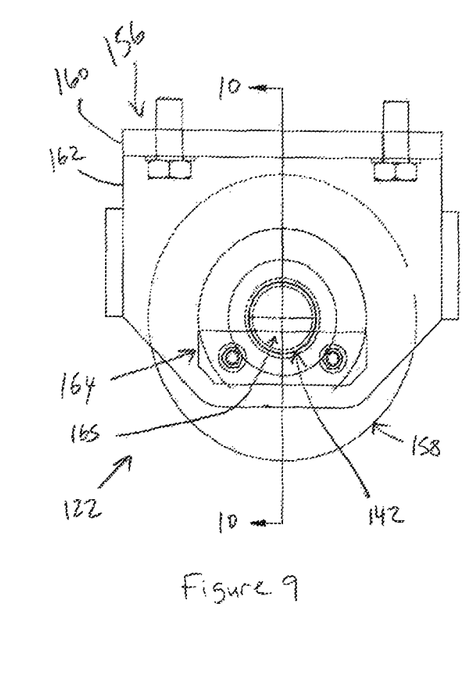
FIG. 9 is a side view of the wheel assembly of FIG. 5.
Figure 10:
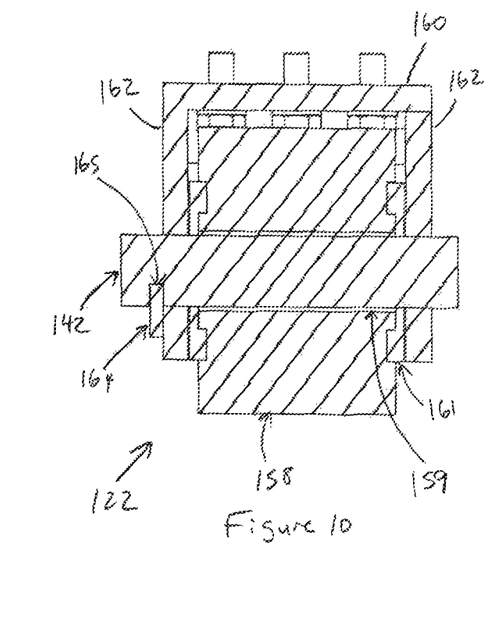
FIG. 10 is a cross-sectional side view of the wheel assembly of FIG. 9 taken at line 10-10.

The communications module 146 includes conventional wireless communications components such as an antenna and a transceiver (or just a transmitter in some embodiments for send-only capability) for communicating wirelessly via a wireless communications network 150 (such as the Internet or a cellular system) with a remote computer 152 that runs application software 154 operable to manipulate and display data received from the communications module (see FIG. 4). The communications module 146 can include a power supply (e.g., a battery, solar panel, or electrical connection for receiving power from a nearby source) or be powered by the same power supply as the compaction control unit for the hydraulic ram.

The remote computer 152 includes a non-transitory computer-readable storage device (e.g., a conventional computer memory device) that stores the application software 154 and a processor (e.g., a conventional microprocessor) that executes the instruction sets of the application software 154. The remote computer 152 is operably connected to at least one input device (e.g., a keyboard/keypad and a mouse or other pointing device) and at least one output device (e.g., a monitor or other display screen) for interfacing use by a user. As such, the remote computer 152 can be provided by a conventional desktop, laptop, or tablet computer, or by a smartphone or other handheld mobile electronic device.

In this way, the scale devices 142 measure an indication of the weight of the waste-loaded waste container 100 and communicate that weight data via the communications module 146 to the remote computer 152. And the remote computer 152 and application software 154 receive that weight data and process it to accurately determine the weight of the waste currently present in the waste container 100 and optionally provide additional functionality based thereon.

The programmed computer 152/154 is programmed to determine the weight of the waste present in the waste container 100 at the time by deducting the known weight of the empty waste container from the determined weight of the waste container 100 and its waste contents. The known weight of the empty waste container is a fixed value that can be stored on the storage device on the remote computer 152 and accessed for the particular waste container 100 being monitored. Typically, a range of different types and sizes of waste containers are monitored and serviced, with the different types and sizes of waste containers having different empty weights. So the weight of each type and size of waste container in use is stored, and the particular type and size of the particular waste container at each particular site is stored, then for determining the waste weight the programmed computer 152/154 identifies the type and size of the waste container and looks up the corresponding empty weight to use.

The determined (i.e., measured) weight of the waste container 100 and its waste contents is based on the weight data measured by and received from the scaling devices 142. For example, in typical embodiments with a plurality of the scaling devices 142, the programmed computer 152/154 is programmed to sum the weight data from the scaling devices 142 to determine the total weight of the waste container 100 and its waste contents, then deduct the known weight of the empty waste container to obtain an accurate measurement of the weight of the waste present in the waste container at the time. In the depicted embodiment with four of the scaling devices 142 (one for each wheel assembly 122), the programmed computer 152/154 thus totals the four pieces of weight data to determine the total weight of the waste container 100 and its waste contents. In this embodiment, weight of the waste container 100 and its waste contents, and the known weight of the empty waste container, each include the weight of the supported components of the weight-measurement system 140 (e.g., the communications module 146, wiring 148, and wheel housing 156), and each exclude the weight of the wheels 158 and the axle load cells 142 (these components are detailed below).

In other embodiments with a plurality of the scaling devices 142, the programmed computer 152/154 is programmed to average the weight data measured by and received from the scaling devices 142 (e.g., by totaling the four pieces of weight data then dividing that total by four) for using this average to represent the total weight of the waste container 100 and its waste contents and then deducting a correspondingly averaged empty container weight. And in other embodiments, the communications module 146 includes a microprocessor that performs this weight-determining operation locally and sends the determined waste weight to the remote computer 152.

The determined weight of the waste present in the waste container 100 at the time can then be output to a user (by a display screen, an alarm, etc.) and/or used by the programmed computer 152/154 for performing further functions. For example, the programmed computer 152/154 can be programmed to receive and store a preset weight limit (e.g., in pounds or kilograms) entered by a user, compare the determined waste weight to the preset weight limit, and generate and send alarms, alerts, or other notifications upon the preset weight limit being reached or neared (e.g., notifications can be sent at one or more preset levels such as 70%, 80%, and 90% of the preset limit). The notifications can be for example a message displayed by the remote computer 152 and/or sent electronically to another electronic device.

A notified user can then schedule a pickup (e.g., a waste-collection vehicle sent to the site for emptying the waste container 100) based on this data (e.g., upon the preset weight limit being reached or neared). In some embodiments, the programmed computer 152/154 is programmed for automatically scheduling pickups upon the preset weight limit being reached. To implement this automatic-scheduling functionality, the programmed computer 152/154 includes or interfaces with a scheduling system for a fleet of waste-collection vehicles. In some embodiments, the pickup history (e.g., determined waste weights when scheduling pickup and later at the time of the actual pickup) for each waste container 100 is stored (e.g., on the storage device), the current pickup lead time (e.g., how soon a waste-collection vehicle can be sent) is regularly updated and accessible, and the programmed computer 152/154 is programmed to access this data and based thereon automatically schedule a next pickup for a time when the waste weight is expected to be is very close to but still below the predetermined weight limit.

In addition, the programmed computer 152/154 can be further programmed to remotely disable the waste container 100 once it reaches a predefined maximum capacity (i.e., load limit) beyond which the waste container exceeds transport weight limits. This maximum capacity can additionally or alternatively be predefined based on other factors such as avoiding overloading (e.g., volumetrically or structurally) the waste container 100. In some embodiments, the predefined maximum capacity and the preset weight limit are the same once-entered value and in other embodiments these can be two separate pieces of data.

For example, the programmed computer 152/154 can be programmed to receive and store a predefined maximum capacity (e.g., in pounds or kilograms) entered by a user and then compare the determined waste weight to the predefined maximum capacity. Upon the programmed computer 152/154 determining that the measured waste weight has reached (or exceeded) the predefined maximum weight, it operates to have a signal sent (e.g., via the communications module 146) to the compaction control unit to disable the hydraulic ram (e.g., by opening a limit switch or otherwise preventing electric power/signals from reaching and operating the hydraulic ram), thereby preventing further waste loading of the waste container.

In this way, the user of the waste container 100 can avoid for example government fines for hauling waste loads that exceed the legal weight maximums set for the particular roadway being used when hauling the waste container 100 to a dump site. These overweight fines are charged back to the user of the waste container 100 even though there was previously no reliable way to determine that the weight maximum had been exceeded before the waste had left the site. Conversely, because the programmed computer 152/154 can determine the appropriate time to send a notification that the waste container 100 should be picked up for emptying based on the determined current weight of the waste (rather than regularly, e.g., every week), the users of the waste container save money because there are no unnecessary pickups when the waste container may still have capacity (e.g., when at only 20% capacity).

Moreover, in embodiments in which the communications module 146 includes a transceiver (instead of only a transmitter), the programmed computer 152/154 can be programmed to send signals to the communications module for example for calibration purposes. Also, in embodiments in which the waste container and/or the weight-measurement system 140 include security-monitoring equipment (anti-tampering devices, motion detectors, etc.) in communication with the communications module 146, the programmed computer 152/154 can be programmed for generating and sending alarms or other notifications based on security-related data received from the communications module 146. And the programmed computer 152/154 can be programmed for determining revenue-related information based on the determined waste weights and pickups/emptyings over time, generate reports including the revenue-related information, and output (e.g., display or send electronically) the reports for review by users.

In typical embodiments, a service-provider user/company provides the waste container 100 and also services it using the weight-measurement system 140 by monitoring its weight, scheduling pickups for emptying, performing such pickups, etc. And the programmed computer 152/154 can be an Internet server and the service-provider company can have an Internet website (e.g., hosted by the Internet server) where it displays this information for accessing/reviewing by its customers (i.e., the actual waste-generating users) of the waste containers 100.

Details of related communications and control systems are disclosed by U.S. Patent Publication No. 2014/0156541 (U.S. Non-Provisional patent application Ser. No. 13/690,574 filed Nov. 30, 2012), which is hereby incorporated herein by reference. Also, such communications modules 146 and programmed computers 152/154 can be of a conventional type, and additional structural and operational details are not needed for a complete understanding of the invention, so such additional details are excluded for brevity.

With particular reference to FIGS. 5-10, structural and operational details of the scale devices 142 will now be described. The scale devices 142 are positioned supporting the waste container 106 and its contents, typically mounted to the base 118 below the container. The scale devices 142 can be provided by load cells that are incorporated into the wheel assemblies 122 to measure an applied force by creating a proportional electrical signal. In typical embodiments, the scale devices 142 are strain gauge load cells of a conventional type, preferably loadpin-type load cells used as axles of the wheel assemblies 122, so no additional or separate axle is included. In other embodiments, other types of load cells can be used, such as compression or shear-beam designs. Generally described, the weight placed into the waste container 100 pushes down on the wheel assemblies 122 with this force substantially absorbed by and generating deflection of the load cell axles 142. This deflection is converted into an electrical signal which is directly proportional the deflection and thus corresponds to and is read as a weight. This measured weight data is then transmitted via the communications systems 144 to the remote computer 152 for use in determining the waste weight (as described above). This measured weight data can also be transmitted via the communications systems 144 to other electronic devices for use by the service-providing company and/or the waste-generating user of the waste container 100.

The depicted axle load cells 142 are incorporated into the wheel assemblies 122, that is, they dual-function as the wheel axles and also measure the supported weight. Because the axle load cells 142 are used in place of conventional wheel axles, they are integrated into the waste container 100 so that no external (i.e., extra and dedicated component mounted to and extending from the container) weight-measuring component is required. In this way, the waste container 100 does not need to be raised to insert a weight-measuring pad underneath it, so there is no height/elevation interference with overhead chutes (for delivering waste into the container) or other related parts of the installation.

The axle load cells 142 are typically generally cylindrical and provided as a component in the assembled weight-measurement wheel assemblies 122. The wheel assemblies 122 each include a housing 156, one of the cylindrical axle load cells 142 fixedly mounted to the housing 156, and a wheel 158 rotationally mounted to the axle load cell. The axle load cells 142 can be fixedly mounted to the housing 156 by a brace member 164 with a portion that is received in a slot 165 of the corresponding axle load cell to retain the corresponding wheel 158 from relative axial and rotational movement, or by tab-and-slot or other mating keyed features. And the wheels 158 can each be rotationally mounted to the corresponding axle load cell 142 by a rolling bearing or bushing 159 to facilitate smooth rotation of the wheel about the axle load cell.

In typical embodiments, the housing 156 includes a mounting plate 160 and two side plates 162 that are spaced apart to receive the wheel 158 between them. The mounting plate 160 can be generally horizontally oriented and the side plates 162 can extend generally vertically downward from opposite ends of the mounting plate, together forming an inverted U-shaped bracket. The side plates 162 each include an opening through which the axle load cell 142 is received for mounting the axle load cell and thus the wheel 158 to the housing 156, so all the supported weight is transmitted from the container 106 through the housing to the axle load cells. Or the axle load cells can be mounted at their ends to support brackets mounted to the housing side plates. A spacer or bumper 161 (e.g., made of UHMW polyethylene) can be inserted between each side of the wheel 158 and each of the housing side plates 162 to facilitate smooth wheel rotation. The housing mounting plates 160 of the wheel assemblies 122 can be mounted to the base frame 118, or directly to the compacting/storing container 106, at mounting locations 166 (e.g., at four corners of a generally rectangular compacting/storing container), by conventional fasteners such as the depicted bolts.

The wheels 158 can be of a conventional size that is typically used for the waste container 100 for the particular application (no modification or customization is typically needed for use in the weight-measurement system 140). Typically, the wheels 158 are substantially rigid and solid (i.e., not hollow and inflatable), for example made of steel, so that they experience substantially no deformation under the load of the waste container 100 and its waste contents, and thus so that the load cells 142 accurately measure the supported load. In other embodiments, the wheels are not solid (e.g., they have internal cavities) but they include a sufficiently strong material, internal ribs or other reinforcements, or other conventional design and/or construction features, such that they are nevertheless substantially rigid and thus experience substantially no deformation under the load of the waste container and its waste contents.

In typical embodiments such as that depicted, the axle load cells 142 are rated at 0.5 mV output at 12,500 pounds, with a 20,000 pound capacity, and made primarily of nickel-plated or stainless steel (or another material selected for strength and durability). Also, the axle load cells 142 include a connector 168 for connecting the wiring 148 in hard-wired embodiments. Axle load cells 142 that can be modified for this use are commercially available from Measurement Systems International (Seattle, Wash.), a division of Rice Lake Weighing Systems Company (Rice Lake, Wis.).

In the embodiment described herein, the weight-measurement system 140 is provided in combination with the waste container 100 as an integrated assembly. In other embodiments, the weight-measurement system 140 is provided as a retrofit kit for installation (e.g., on-site) on an existing waste container 100 without a compatible communications system 144. In such embodiments, the weight-measurement system 140 in its entirety (including the wheel assemblies 122 with the scale devices 142 and including the communications system 144 with the communications module 146) is mounted to and includes the base frame 118 adapted to be inserted under and support the existing waste container 100. In yet other embodiments, the weight-measurement wheel assemblies 122 (including the axle load cells 142) by themselves (e.g., four of them) are provided as a retrofit kit for installation (e.g., on-site) on an existing waste container 100 with a communications system 144 (e.g., by swapping out conventional wheel assemblies with the weight-measurement wheel assemblies in the field and wiring them to the communications module 146. And in still other embodiments, the invention relates to a method of measuring the weight of waste in a waster container, for example stored on a non-transitory computer-readable storage device, for implementing the above-described functionality of using the load cells to measure the weight of the waste container and its waste contents and then determine the weight of the waste contents as the remainder after deducting the weight of the waste container.

In other embodiments of the weight-measurement system, four (or another number) of the axle-type load cells are used as axles for four (or another number) of wheels for a scaling frame or platform on which the bottom of the waste container rests and is supported to measure the weight of the waste container and the waste contents. And in other embodiments, one or more load cells are included in a pulley system configured for measuring the weight of the waste container and the waste contents.

Figure 11:
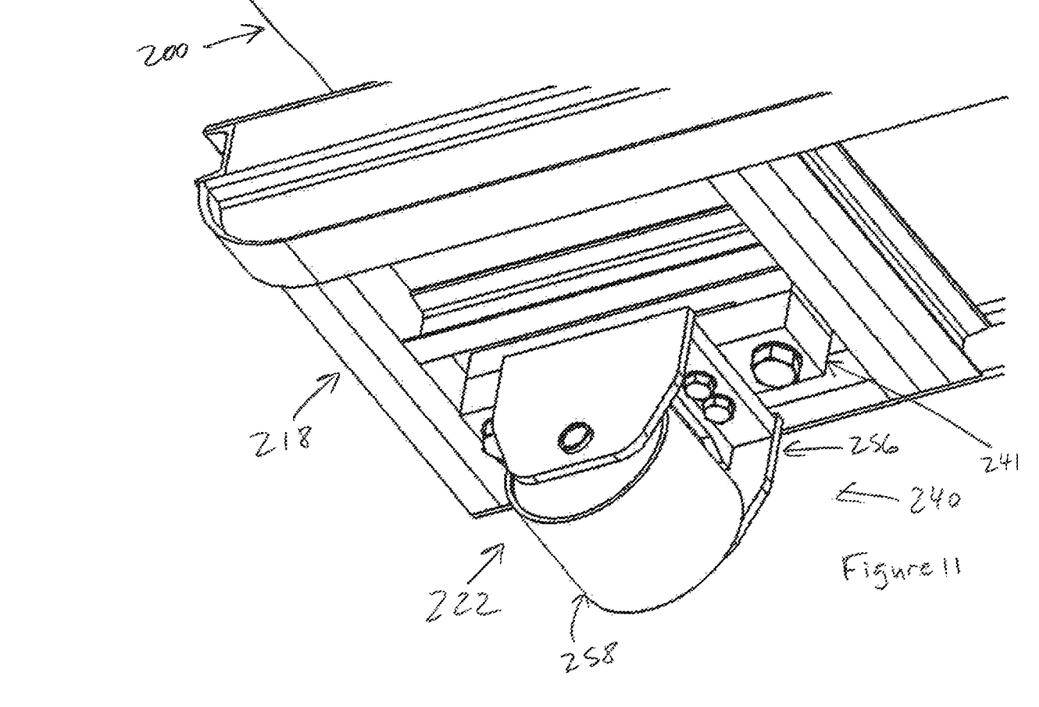
FIG. 11 is a perspective view of a portion of a waste container system outfitted with a weight-measurement system according to a second example embodiment of the present invention.

FIG. 11 shows a waste container 200 outfitted with a weight-measurement system 240 according to a second example embodiment of the invention. The waste container 200 and the weight-measurement system 240 of this embodiment can be substantially the same as those described above, with noted exceptions. In particular, in this embodiment, instead of a load-pin load cell used as the axle for each wheel 258, each of the wheel assemblies 222 has a respective double-ended shear-beam load cell 241 mounted between it (e.g., its housing 256) and the waste container (e.g., its frame 218 or container bottom) 200 to measure the weight of the waste container and its waste contents. Suitable such DESB-type load cells are known in the art and commercially available from various manufacturers. In this embodiment, weight of the waste container 200 and its waste contents, and the known weight of the empty waste container, each additionally exclude the weight of the entire wheel assemblies 222.

Figure 12:
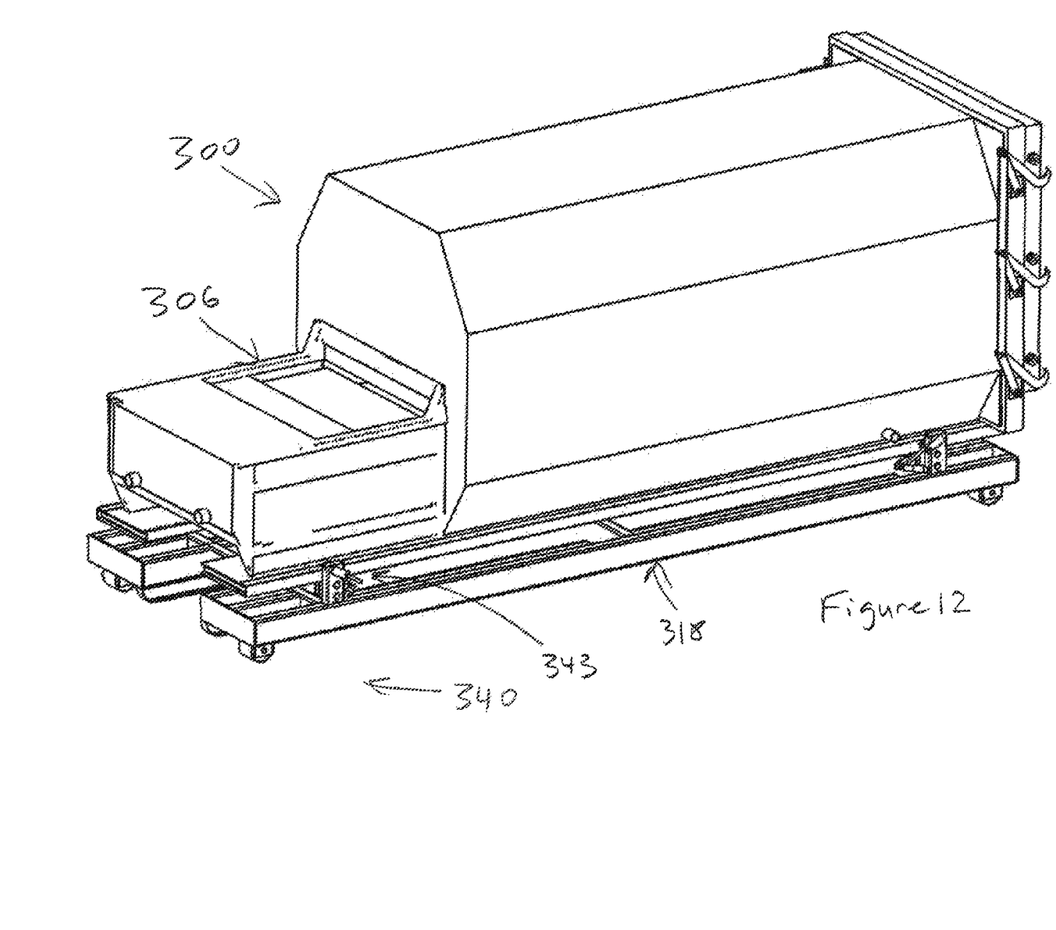
FIG. 12 is a perspective view of a portion of a waste container system outfitted with a weight-measurement system according to a third example embodiment of the present invention.

FIG. 12 shows a waste container 300 outfitted with a weight-measurement system 340 according to a third example embodiment of the invention. The waste container 300 and the weight-measurement system 340 of this embodiment can be substantially the same as those described above, with noted exceptions. In particular, in this embodiment, instead of a load-pin load cell used as the axle for each wheel, the charge/storage container 306 floats on S-beam or double-ended shear-beam load cells 343 that are fixed to the base frame 318 (or to another support structure such as a floor). A hand lever is linked to the load cells 343 and operable to change the weighing system from a live weighing mode when stationary to a lock-out mode when the container 306 is rolled off the base frame 318 for emptying. Suitable such S-beam and/or DESB-type load cells are known in the art and commercially available from various manufacturers. In this embodiment, weight of the waste container 300 and its waste contents, and the known weight of the empty waste container, each additionally exclude the weight of the base framer 318.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in example forms, it will be apparent to those skilled in the art that many modifications, additions, and deletions can be made therein without departing from the spirit and scope of the invention as defined by the following claims.

What is claimed is:

1. A waste container system for use with a remote computer, comprising:
 a container for storing waste;
 wheel assemblies including wheels that support and enable rolling movement of the waste container; and
 a weight-measurement system including scale devices and a communications system, where the communications system includes a communications module with wireless components for sending weight data from the scale devices to the remote computer, wherein the scale devices are provided by load cells supporting the waste container and the stored waste with all of the weight of the waste container and the stored waste transmitted to the load cells to deflect the load cells and create electrical signals directly proportional the load-cell deflection, wherein the load-cell scale devices are integral to the waste container, wherein the electrical signals represent the weight data that is transmitted by the communications system to the remote computer, wherein the load cells are incorporated into the wheel assemblies, wherein the load cells are load-pin load cells onto which the wheels are mounted so that the load cells dual function as the scale devices and as axes for the wheels, and wherein the load-cell scale devices measure the weight of the waste container and the stored waste.

2. The waste container system of claim 1, wherein the wheel assemblies further include housings with side plates defining openings through which the load cells extend, with the load cells fixedly mounted to the housing side plates, and with the wheels rotationally mounted to the load cells.

3. The waste container system of claim 1, wherein the wheel assemblies further include housings to which the load cells are mounted and brace members that are received in slots of the load cells to prevent axial and rotational motion of the load cells relative to the housings.

4. The waste container system of claim 1, wherein the wheels are substantially rigid and experience substantially no deformation under the weight of the supported waste container and the store waste.

5. The waste container system of claim 1, wherein the waste container is a compactor.

6. A weight-measurement wheel assembly for a waste container system including a waste container and a communications system, the weight-measurement wheel assembly comprising:

a housing that is mountable to the waste container, a scale device mounted to the housing and operably connectable to the communications system, and a wheel mounted to the scale device, wherein the scale device includes at least one load cell, wherein in use when the load-cell scale device is mounted to the waste container, all of the weight of the waste container and the stored waste is transmitted to the load cell to deflect the load cell and create an electrical signal directly proportional the load-cell deflection and representing weight data that is transmitted by the communications system to the remote computer so that the load-cell scale device measures the weight of the waste container and the store waste, and wherein the load cell is incorporated into the wheel assembly, wherein the wheel assembly further includes a brace member that is received in a slot of the load cell to prevent axial and rotational motion of the load cell relative to the housing.

7. The weight-measurement wheel assembly of claim 6, wherein the housing includes side plates defining openings through which the load cell extends.

8. The weight-measurement wheel assembly of claim 6, wherein the wheel is substantially rigid and in use experiences substantially no deformation under the weight of the supported waste container and the stored waste.

9. A plurality of the weight-measurement wheel assemblies, in combination with the waste container, the communications system, or both, of claim 6.

10. The weight-measurement wheel assembly of claim 6, wherein the load cell dual-functions as the scale device and as the axle for the wheel.

11. The weight-measurement wheel assembly of claim 7, wherein the load cell is fixedly mounted to the housing side plates and the wheel is rotationally mounted to the load cell.

12. The weight-measurement wheel assembly of claim 7, wherein the waste container is a compactor.

13. A method of measuring the weight of waste in a waste container having at least one wheel assembly supporting the waste container, comprising:

receiving, from a communications system of the waste container, weight data representing the total weight of the waste container and the stored waste;

accessing the weight of the waste container when empty; and deducting the weight of the waste container when empty from the total weight of the waste container and the stored waste to determine the weight of the waste in the waste container, wherein the weight data includes a signal generated by a load cell supporting the waste container, and wherein the load cell is incorporated into the wheel assembly or mounted between the wheel assembly and the waste container, and wherein the load cell is a load-pin load cell, to which the wheel assembly supporting the waste container is mounted, so that the load cell dual-functions as a scale device and as an axle for the wheel assembly.

14. The method of claim 13, wherein the weight data includes multiple weight datum generated by multiple of the load cells supporting the waste container, and wherein the method further comprises summing the weight data to determine the total weight of the waste container and the stored waste.

15. The method of claim 13, wherein the method further comprises receiving a preset waste weight limit, comparing the preset waste weight limit to the determined weight of the waste in the waste container, and if the determined weight of the waste in the waste container is equal to or a predefined portion of the preset waste weight limit then generating a notification to a user.

16. The method of claim 13, wherein the method further comprises receiving a preset waste weight limit, comparing the preset waste weight limit to the determined weight of the waste in the waste container, and if the determined weight of the waste in the waste container is equal to or a predefined portion of the preset waste weight limit then sending to the communications system of the waste container a signal to disable the waste container.

17. A non-transitory computer-readable storage device storing instructions for performing the method of claim 13.

18. A weight-measurement wheel assembly for a waste compactor system including a waste compactor and a communications system, the weight-measurement wheel assembly comprising:

a housing that is mountable to the waste compactor, a scale device mounted to the housing and operably connectable to the communications system, and a wheel mounted to the scale device, wherein the scale device includes at least one load cell, wherein in use when the load-cell scale device is mounted to the waste compactor, all of the weight of the waste compactor and the stored waste is transmitted to the load cell to deflect the load cell and create an electrical signal directly proportional the load-cell deflection and representing weight data that is transmitted by the communications system to the remote computer so that the load-cell scale device measures the weight of the waste compactor and the stored waste, wherein the housing includes side plates defining openings through which the load cell extends, and wherein the load cell dual-functions as the scale devices and as an axle for the wheel.

19. A waste compactor system for use with a remote computer, comprising:

a waste compactor for storing waste;

wheel assemblies including wheels that support and enable rolling movement of the waste compactor; and a weight-measurement system including scale devices, a housing, and a communications system, where the communications system includes a communications module with wireless components for sending weight data from the scale devices to the remote computer, wherein the scale devices are provided by load cells supporting the waste compactor and the stored waste with all of the weight of the waste compactor and the stored waste transmitted to the load cells to deflect the load cells and create electrical signals directly proportional the load-cell deflection, wherein the load-cell scale devices are integral to the waste compactor, wherein the electrical signals represent the weight data that is transmitted by the communications system to the remote computer, wherein the load cells are incorporated into the wheel assemblies, wherein the load cells are load-pin load cells onto which the wheels are mounted so that the load cells dual function as the scale devices and as axles for the wheels, wherein the load-cell scale devices measure the weight of the waste compactor and the stored waste, and wherein the housing is mounted to the waste compactor and includes side plates defining openings through which the load cell extends.

* * * * *